(12) United States Patent
Takahashi et al.

(10) Patent No.: US 12,730,944 B2
(45) Date of Patent: Sep. 8, 2026

(54) PIPING DIAGRAM CREATION METHOD AND PIPING DIAGRAM CREATION DEVICE

(71) Applicant: KUBOTA CORPORATION, Osaka (JP)

(72) Inventors: Shimpei Takahashi, Tokyo (JP); Mitsuo Hayashi, Tokyo (JP); Seiki Mitsumori, Tokyo (JP)

(73) Assignee: KUBOTA CORPORATION, Osaka (JP)

( * ) Notice: Subject to any disclaimer, the term of this patent is extended or adjusted under 35 U.S.C. 154(b) by 961 days.

(21) Appl. No.: 17/927,026

(22) PCT Filed: Jun. 2, 2021

(86) PCT No.: PCT/JP2021/020928
§ 371 (c)(1),
(2) Date: Nov. 22, 2022

(87) PCT Pub. No.: WO2021/246428
PCT Pub. Date: Dec. 9, 2021

(65) Prior Publication Data

US 2023/0205942 A1 Jun. 29, 2023

(30) Foreign Application Priority Data

Jun. 3, 2020 (JP) ................................ 2020-096566

(51) Int. Cl.
*G06F 30/18* (2020.01)
*G06F 30/27* (2020.01)
(Continued)

(52) U.S. Cl.
CPC .............. *G06F 30/18* (2020.01); *G06F 30/27* (2020.01); *G06F 2111/06* (2020.01); *G06F 2113/14* (2020.01)

(58) Field of Classification Search
CPC .......... G06F 30/00; G06F 30/18; G06F 30/27; G06F 2111/06; G06F 2113/14; G06F 30/13; G06F 30/12; G06F 2111/12
(Continued)

(56) References Cited

U.S. PATENT DOCUMENTS 10,769,321 B2 * 9/2020 Ferri ....................... G06F 30/13
2016/0283613 A1 9/2016 Ferri, II

FOREIGN PATENT DOCUMENTS

CN 106383955 A * 2/2017 ............ G06F 30/17
JP H07-244685 A 9/1995
(Continued)

OTHER PUBLICATIONS

Sui et al., "Branch-Pipe-Routing Approach for Ships Using Improved Genetic Algorithm," Frontiers of Mechanical Engineering, 2016, vol. 11, No. 3, pp. 316-323.
(Continued)

*Primary Examiner* — Cedric Johnson
(74) *Attorney, Agent, or Firm* — Oliff PLC

(57) ABSTRACT

A piping diagram creation device is provided configured to: generate virtual pipelines, the virtual pipelines being identified by characteristic evaluation data expressed as a sequence of numbers with an assembling angle θi of assembling portions of the respective straight pipes and cut pipes allocated between respective intersections, and an adjustment margin Lj of the cut pipe length as variables; calculate an evaluation value of each virtual pipeline based on a difference value and so on between the total number of intersections and control points and the number of intersections and control points having an error between the virtual pipeline and each intersection and between the virtual pipeline and each control point at or below a predetermined threshold, the latter number being a continuous count from
(Continued)

the start point; and generate a pipeline assembling diagram based on one virtual pipeline with an excellent evaluation value.

12 Claims, 10 Drawing Sheets

(51) Int. Cl.
*G06F 111/06* (2020.01)
*G06F 113/14* (2020.01)

(58) Field of Classification Search
USPC .............................................................. 703/1
See application file for complete search history.

(56) References Cited

FOREIGN PATENT DOCUMENTS

JP H08287132 A * 11/1996
JP 2000-99489 A 4/2000
JP 2010-44707 A 2/2010
JP 2019-106141 A 6/2019

OTHER PUBLICATIONS

Guirardello et al., "Optimization of Process Plant Layout with Pipe Routing," Computers & Chemical Engineering, 2005, vol. 30, pp. 99-114.
May 16, 2024 Extended Search Report issued in European Patent Application No. 21817272.4.
Aug. 24, 2021 International Search Report issued in International Patent Application No. PCT/JP2021/020928.
Dec. 6, 2022 International Preliminary Report on Patentability issued in International Patent Application No. PCT/JP2021/020928.

* cited by examiner

IP4
CP
2
1
IP1
IP2
IP3
Fig.1A
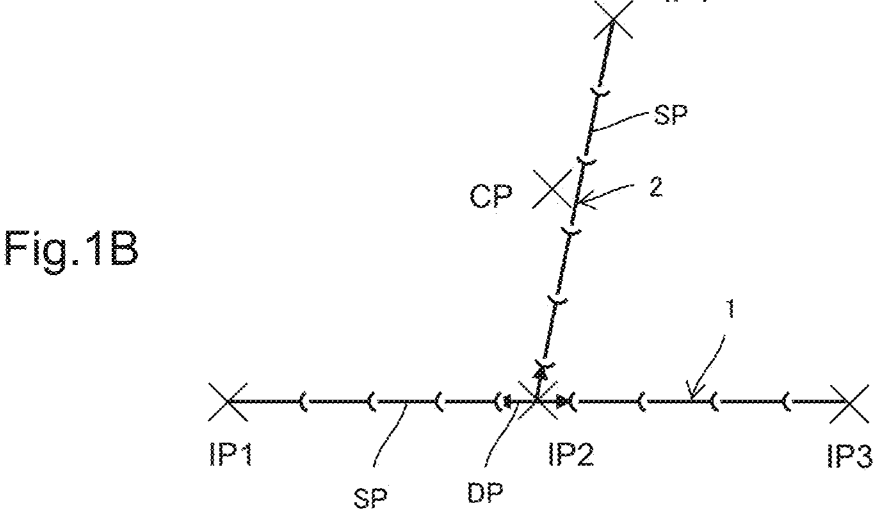
Fig.1B
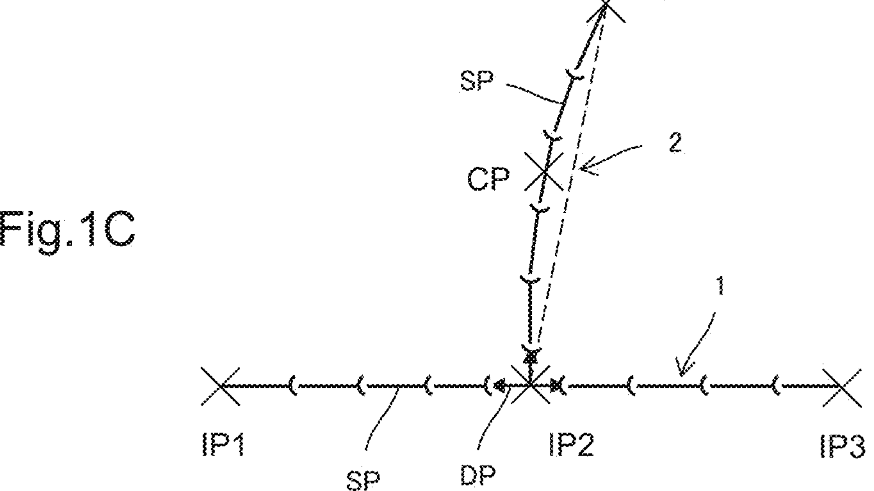
Fig.1C

| ROUTE NUMBER | INTERSECTION NUMBER | X COORDINATES | Y COORDINATES | ALLOWABLE MOVEMENT |
|---|---|---|---|---|
| 1 | 1 | 1500.097 | 626.647 | 1 |
| 1 | 2 | 1499.448 | 624.602 | 1 |
| 1 | 3 | 1494.759 | 626.082 | 1 |
| 1 | 4 | 1420.56 | 567.31 | 1 |
| 1 | 5 | 1340.129 | 536.545 | 1 |
| 1 | 6 | 1334.979 | 534.605 | 1 |
| 1 | 7 | 1332.178 | 533.551 | 1 |
| 1 | 8 | 1331.461 | 533.28 | 1 |
| 1 | 9 | 1328.528 | 526.857 | 1 |
| 1 | 10 | 1324.735 | 525.427 | 1 |
| 2 | 1 | 1420.56 | 567.31 | 1 |
| 2 | 2 | 1420.732 | 566.9 | 1 |
| 2 | 3 | 1422.676 | 562.279 | 1 |
| 3 | 1 | 1340.129 | 536.545 | 1 |
| 3 | 2 | 1339.973 | 536.961 | 1 |
| 3 | 3 | 1339.791 | 537.443 | 1 |
| 3 | 4 | 1338.234 | 538.148 | 1 |
| 3 | 5 | 1337.89 | 539.161 | 1 |

Fig.7

| ROUTE NUMBER | INTERSECTION NUMBER | FITTINGS |
|---|---|---|
| 1 | 1 | |
| 1 | 2 | |
| 1 | 3 | |
| 1 | 4 | TEE |
| 1 | 5 | TEE |
| 1 | 6 | GATE VALVE |
| 1 | 7 | REDUCER |
| 1 | 8 | |
| 1 | 9 | |
| 1 | 10 | |
| 2 | 1 | |
| 2 | 2 | GATE VALVE |
| 2 | 3 | |
| 3 | 1 | |
| 3 | 2 | GATE VALVE |
| 3 | 3 | |
| 3 | 4 | |
| 3 | 5 | |

| ROUTE NUMBER WHERE CONTROL POINT(S) IS SET | START POINT-SIDE INTERSECTION IN SECTION WHERE CONTROL POINT(S) IS SET | END POINT-SIDE INTERSECTION IN SECTION WHERE CONTROL POINT(S) IS SET | X COORDINATES OF CONTROL POINTS | Y COORDINATES OF CONTROL POINTS |
|---|---|---|---|---|
| 1 | 3 | 4 | 1457.948 | 588.38 |
| 1 | 3 | 4 | 1427.396 | 570.232 |
| 1 | 4 | 5 | 1413.694 | 564.684 |
| 1 | 4 | 5 | 1399.676 | 559.322 |
| 1 | 4 | 5 | 1381.025 | 552.188 |

Fig.9B

| ROUTE NUMBER | ROUTE NUMBER TO CONNECT | INTERSECTION TO CONNECT |
|---|---|---|
| 1 | 0 | 0 |
| 2 | 1 | 4 |
| 3 | 1 | 5 |

PIPING DIAGRAM CREATION METHOD AND PIPING DIAGRAM CREATION DEVICE

TECHNICAL FIELD

The present invention relates to a piping diagram creation method and a piping diagram creation device.

BACKGROUND ART

Patent Literature 1 discloses a drawing information management device including: a storage means configured to store installation drawing information for a fluid supply facility as a piping network consisting of intersection points of fluid supply pipes and a single pipeline that is a collection of a plurality of fluid supply pipes in series and connects the intersection points; a region identification means configured to identify a construction region within the information stored in the storage means, and an output means configured to output the installation drawing information for the construction region identified by the region identification means to a plotter configured to create construction drawings. The drawing information management device performs a piping layout process of connecting the single pipeline between the intersections with a plurality of straight pipes.

When a newly laid pipeline is designed or a pipeline to renew an existing one is designed using a piping diagram creation device with an application program for creating piping diagrams installed, a conventional method creates a planned piping route as follows: via a pointing device, locations of fittings such as bends are specified as intersections on a pipeline diagram layer superimposed on a map layer displayed on a screen; and the fittings at the respective intersections are connected with a plurality of straight pipes.

There is also a piping diagram creation device that incorporates an automatic piping layout function to automatically perform a piping layout process, taking into account the complexity for designers to perform a piping layout process of manually selecting and laying out a pipeline along a planned piping route.

CITATION LIST

Patent Literature

Patent Literature 1: Japanese Unexamined Patent Application Publication No. 08-287132

SUMMARY OF INVENTION

Technical Problem

However, as shown in FIG. 1A, in cases where a branch pipeline 2 branching off at a predetermined intersection IP2 from a main pipeline 1 that connects intersections IP1-IP3 in a straight line is formed and the branch pipeline 2 connecting the branch point IP2 and an intersection IP4 on the branch route is inclined at any inclination angle with respect to the main pipeline 1, performing a piping layout process using the above automatic piping layout function will lead to a problem. Specifically, as shown in FIG. 1B, a socket of a fitting DP such as a double socket tee disposed at the branch point IP2 will be designed at an angle different from its original shape, and also the straight pipes SP will be disposed in a straight line due to inability to bend the straight pipes SP utilizing their permitted bending angles at pipe assembling portions. As such, the automatic piping layout function can only generate piping diagrams in which intersections are merely connected with a straight line.

Since it is impossible to perform the pipe laying work based on such a piping diagram, the automatic piping layout function is indeed unusable and designers have to perform a complicated piping layout process of manually selecting and laying out pipes of fittings to be installed.

In view of the above problems, it is an object of the present invention to provide a piping diagram creation method and a piping diagram creation device capable of automatically generating a piping diagram that can be utilized in actual laying work independently of angles at branch portions and other factors.

Solution to Problem

To solve the above problems, as a first feature of a piping diagram creation method according to the present invention, the method creates a piping diagram of a pipeline connecting a plurality of intersections (IP) specified on a map between a start point and an end point and passing through a control point (CP) selectively specified between the respective intersections (IP) and includes the following steps:

- a first step of selecting fittings to be disposed at the respective intersections (IP);
- a second step of determining a number of straight pipes required, presence or absence of cut pipes, and a length of the cut pipes, based on a distance between the respective intersections (IP) and a length of the straight pipes;
- a third step of generating virtual pipelines on which the straight pipes and the cut pipes determined at the second step are allocated between the respective intersections (IP), each of the virtual pipelines being identified by characteristic evaluation data expressed as a sequence of numbers with an assembling angle $\theta i$ (i is a number of assembling portions) of assembling portions of the respective straight pipes and cut pipes constituting the virtual pipeline and an adjustment margin Lj (j is the number of cut pipes) of the cut pipe length as variables that are settable within a predetermined allowable range;
- a fourth step of calculating an evaluation value of each of the virtual pipelines generated at the third step based on (1) a first characteristic value identified by a difference value between a total number of intersections (IP) and control points (CP) and a number of intersections (IP) and control points (CP) each having an error at or below a predetermined threshold, the latter number being a continuous count from the start point, the error being defined as an amount of misalignment between the virtual pipeline and each intersection (IP) and between the virtual pipeline and each control point (CP), (2) a second characteristic value identified by the error at one of the intersections (IP) or the control point (CP) that first exceeds the threshold, (3) a third characteristic value identified by an average value of the errors at the intersections (IP) and the control point (CP) having the errors at or below the threshold, and (4) a fourth characteristic value identified by a proportion of a number of assembling portions with the assembling angle $\theta i$ of other than 0 degrees, within a range from the start point to the intersections (IP) and the control point (CP) having the errors at or below the threshold; a fifth step of selecting one virtual pipeline from the virtual pipelines based on the evaluation value; and a sixth step of generating a pipeline assembling diagram based on characteristic evaluation data of the virtual pipeline selected at the fifth step.

At the first step, fittings to be disposed at the plurality of intersections (IP) specified on a map between a start point and an end point are selected. At the second step, the number of straight pipes required, the presence or absence of cut pipes, and a length of the cut pipes are determined based on a distance between the respective intersections (IP) and a length of the straight pipes. At the third step, virtual pipelines are generated on which the thus determined straight and cut pipes are allocated between the respective intersections (IP). Each of the virtual pipelines is identified by characteristic evaluation data expressed as a sequence of numbers with the assembling angle θi (i is the number of assembling portions) of assembling portions of the respective straight pipes and cut pipes and an adjustment margin Lj (j is the number of cut pipes) of the cut pipe length as variables that are settable within a predetermined allowable range.

At the fourth step, the first characteristic value, the second characteristic value, the third characteristic value, and the fourth characteristic value are calculated, and an evaluation value for evaluating each virtual pipeline identified by the characteristic evaluation data is calculated based on these characteristic values. The first characteristic value is a difference value between the total number of intersections (IP) and control points (CP) and the number of intersections (IP) and control points (CP) each having an error at or below a predetermined threshold, the latter number being a continuous count from the start point, the error being defined as an amount of misalignment between the virtual pipeline and each intersection (IP) and between the virtual pipeline and each control point (CP). The second characteristic value is the error at one of the intersections (IP) or the control point (CP) that first exceeds the threshold. The third characteristic value is an average value of the errors at the intersections (IP) and the control point (CP) having the errors at or below the threshold. The fourth characteristic value is a proportion of the number of assembling portions with the assembling angle θi of other than 0 degrees, out of the intersections (IP) having in the errors at or below the threshold.

At the fifth step, one virtual pipeline is selected from the virtual pipelines based on the evaluation values. At the sixth step, a pipeline assembling diagram is generated based on the characteristic evaluation data of the virtual pipeline selected at the fifth step.

In addition to the first feature above, the piping diagram creation method in accordance with the present invention has a second feature that the evaluation value is a sum of products of the respective characteristic values by predetermined weighting factors for the respective characteristic values.

Each of the plurality of virtual pipelines identified by the characteristic evaluation data is evaluated using, as the evaluation value, a sum of products of the respective characteristic values by predetermined weighting factors for the respective characteristic values. As such, contributions of the respective characteristic values to the evaluation value can be adjusted by the weighting factors, resulting in a well-balanced evaluation value.

In addition to the first or second feature above, the piping diagram creation method in accordance with the present invention has a third feature that the third step includes forming the respective virtual pipelines from individuals including, as genes, the assembling angle θi (i is the number of assembling portions) of the assembling portions of the respective straight pipes and cut pipes and the adjustment margin Lj (j is the number of cut pipes) of the cut pipe length, the fifth step includes executing a genetic algorithm to generate an individual with optimized genes, the genetic algorithm iterating a generation change process including any of a selection process of selecting one or more certain individuals based on evaluation values of respective individuals, a crossover process of recombining genes between individuals, and a mutation process of changing genes of any individual, and the sixth step includes generating a pipeline assembling diagram based on the optimized genes of the individual.

Each virtual pipeline is defined as an individual including, as genes, the assembling angle θi (i is the number of assembling portions) of the assembling portions of the respective straight pipes and cut pipes and the adjustment margin Lj (j is the number of cut pipes) of the cut pipe length, and an genetic algorithm is executed on the virtual pipelines as a plurality of individuals having different genes, whereby an appropriate pipeline assembling diagram is automatically generated based on genes of an individual having undergone the generation change process. The generation change process includes any one of or any combination of the selection process, the crossover process, and the mutation process.

In addition to the third feature above, the piping diagram creation method in accordance with the present invention has a fourth feature that the selection process includes an elite strategy method of extracting an individual with a best evaluation value from all of the individuals and a tournament method of iterating a process of selecting an individual with a relatively good evaluation value from any number of individuals randomly selected from remaining ones of the individuals until a number of individuals obtained by the selection process equals a number of individuals of a relevant generation.

The number of individuals individually identifying virtual pipelines of a certain generation is the population. Employing the elite strategy method allows an individual with the best evaluation value out of the virtual pipelines of the certain generation to survive into the next generation. Also, employing the tournament method allows individuals with more excellent genes to survive into the next generation by iterating the process of selecting an individual with a relatively excellent evaluation value from any number of individuals randomly selected from the certain generation until the number of selected individuals equals the population.

In addition to the third or fourth feature above, the piping diagram creation method in accordance with the present invention has a fifth feature that the crossover process includes a process of taking adjacent even-numbered and odd-numbered ones of the individuals with a certain probability and performing crossover of genes by a two-point crossover method.

In the crossover process, it is preferable to take adjacent even-numbered and odd-numbered ones of the individuals with a certain probability and perform crossover of genes by a two-point crossover method.

In addition to any one of the third to fifth features above, the piping diagram creation method in accordance with the present invention has a sixth feature that the mutation process includes a process of selecting a certain proportion of individuals with lesser evaluation values from the individuals and setting all genes thereof to zero.

Through the mutation process of setting all genes of a certain proportion of individuals with lesser evaluation values to zero, virtual pipelines with genes exhibiting straight pipeline shapes can survive into the next generation at a certain ratio. In the context of generating a straight pipeline, iterating such a process can generate a pipeline having excellent linearity with less fluctuations, rather than a straight pipeline that has many fluctuations with repeated unnecessary bends of assembling portion of pipe.

In addition to any one of the third to sixth features above, the piping diagram creation method in accordance with the present invention has a seventh feature that the mutation process includes a process of swapping any adjacent genes of an individual extracted with a certain probability from the individuals.

Swapping arbitrarily selected genes has a large effect on the entire pipeline, which would make it difficult to improve the evaluation value even through generational changes. However, swapping adjacent genes allows for fine adjustment while reducing the effect on the entire pipeline.

In addition to any one of the first to seventh features above, the piping diagram creation method in accordance with the present invention has an eighth feature that the method further includes a pre-determination step of determining in advance whether it is possible to carry out a piping layout along a straight line connecting respective intersections (IP), based on shapes of fittings to be disposed at the respective intersections (IP) or presence/absence of a control point (CP) specified between the respective intersections (IP), and upon determination at the pre-determination step that it is impossible to carry out the piping layout along the straight line connecting the intersections (IP), the second to sixth steps are performed.

Upon determination at the pre-determination step that it is impossible to carry out the piping layout along the straight line connecting the intersections, the second to sixth steps are performed, which facilitates an efficient process.

As a first feature of a piping diagram creation device according to the present invention, the device creates a piping diagram of a pipeline connecting a plurality of intersections (IP) specified on a map between a start point and an end point and passing through a control point (CP) selectively specified between the respective intersections (IP) and includes: a first calculation section configured to select fittings to be disposed at the respective intersections (IP); a second calculation section configured to determine a number of straight pipes required, presence or absence of cut pipes, and a length of the cut pipes, based on a distance between the respective intersections (IP) and a length of the straight pipes; a third calculation section configured to generate virtual pipelines on which the straight pipes and the cut pipes determined by the second calculation section are allocated between the respective intersections (IP), each of the virtual pipelines being identified by characteristic evaluation data expressed as a sequence of numbers with an assembling angle θi (i is a number of assembling portions) of assembling portions of the respective straight pipes and cut pipes constituting the virtual pipeline and an adjustment margin Lj (j is a number of cut pipes) of the cut pipe length as variables that are settable within a predetermined allowable range; a fourth calculation section configured to calculate an evaluation value of each of the virtual pipelines generated by the third calculation section based on (1) a first characteristic value identified by a difference value between a total number of intersections (IP) and control points (CP) and a number of intersections (IP) and control points (CP) each having an error at or below a predetermined threshold, the latter number being a continuous count from the start point, the error being defined as an amount of misalignment between the virtual pipeline and each intersection (IP) and between the virtual pipeline and each control point (CP), (2) a second characteristic value identified by the error at one of the intersections (IP) or the control point (CP) that first exceeds the threshold, (3) a third characteristic value identified by an average value of the errors at the intersections (IP) and the control point (CP) having the errors at or below the threshold, and (4) a fourth characteristic value identified by a proportion of a number of assembling portions with the assembling angle θi of other than 0 degrees, within a range from the start point to the intersections (IP) and the control point (CP) having the errors at or below the threshold; a fifth calculation section configured to select one virtual pipeline from the virtual pipelines based on the evaluation value; a sixth calculation section configured to generate a pipeline assembling diagram based on characteristic evaluation data of the virtual pipeline selected by the fifth calculation section.

In addition to the first feature above, the piping diagram creation device in accordance with the present invention has a second feature that the evaluation value is a sum of products of the respective characteristic values by predetermined weighting factors for the respective characteristic values.

In addition to the first or second feature above, the piping diagram creation device in accordance with the present invention has a third feature that the third calculation section is configured to form the respective virtual pipelines from individuals including, as genes, the assembling angle θi (i is the number of assembling portions) of the assembling portions of the respective straight pipes and cut pipes and the adjustment margin Lj (j is the number of cut pipes) of the cut pipe length, the fifth calculation section is configured to execute a genetic algorithm to generate an individual with optimized genes, the genetic algorithm iterating a generation change process including any of a selection process of selecting one or more certain individuals based on evaluation values of respective individuals, a crossover process of recombining genes between individuals, and a mutation process of changing genes of any individual, and the sixth calculation section is configured to generate a pipeline assembling diagram based on the optimized genes of the individual.

In addition to the third feature above, the piping diagram creation device in accordance with the present invention has a fourth feature that the selection process includes an elite strategy method of extracting an individual with a best evaluation value from all of the individuals and a tournament method of iterating a process of selecting an individual with a relatively good evaluation value from any number of individuals randomly selected from remaining ones of the individuals until a number of individuals obtained by the selection process equals a number of individuals of a relevant generation.

Advantageous Effects of Invention

As described above, the present invention provides a piping diagram creation method and a piping diagram creation device capable of automatically generating a piping diagram that can be utilized in actual pipe laying work independently of angles at branch portions and other factors.

BRIEF DESCRIPTION OF DRAWINGS

FIG. 1A illustrates routes of main and branch pipes connecting specified intersections, FIG. 1B illustrates a piping diagram generated by a conventional automatic piping layout device, and FIG. 1C illustrates a piping diagram generated by a piping diagram creation device of the present invention.

FIG. 7 illustrates coordinates of the intersections and control points shown in FIG. 6A and their allowable movement.

FIG. 8 illustrates fittings disposed at intersections.

FIG. 9A illustrates coordinates of control points, and FIG. 9B illustrates relationship between route numbers and connection points.

MODE FOR CARRYING OUT THE INVENTION

Hereinafter, a piping diagram creation method and a piping diagram creation device according to the present invention are described with reference to the drawings.

First Aspect of the Piping Diagram Creation Device

Figure 2:
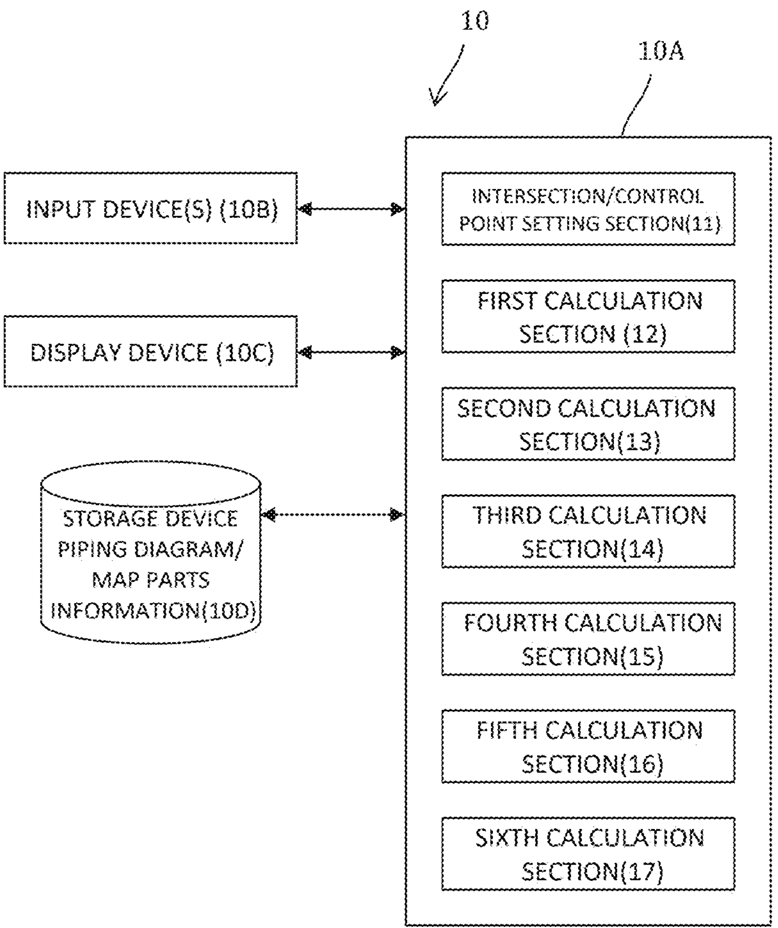
FIG. 2 illustrates the piping diagram creation device according to the present invention.

FIG. 2 is a functional block diagram of the piping diagram creation device 10. The piping diagram creation device 10 is a device to create a piping diagram (see FIGS. 1A-IC) of a pipeline (also referred to as a planned line) that connects a plurality of intersections IP specified on a map between a start point and an end point and passes through a control point(s) CP selectively specified between the respective intersections IP. The piping diagram creation device 10 includes a computer main unit 10A, and one or more input devices 10B, a display device 10C, a storage device 10D, etc. connected to the computer main unit 10A.

A pointing device, such as a mouse, and a keyboard are used as the input devices 10B, a liquid crystal display is used as the display device 10C, and a hard disk or the like is used as the storage device 10D. An output device such as a printer is also connected to the computer main unit 10A, though not shown in the figure.

The storage device 10D stores information necessary to create pipeline diagrams, including parts information about parts constituting a pipeline, map information, and pipeline diagrams created in the past. The parts information includes types of pipes, such as straight pipes and fittings, and their nominal diameters and pipe lengths.

The computer main unit 10A is equipped with a mother board with a CPU, a memory board, and the like, and an application program for designing pipeline diagrams is installed in a memory on the memory board. Various functional blocks described below are implemented as the CPU executes the application program.

In other words, the computer main unit 10A includes the following functional blocks: an intersection/control point setting section 11 for setting intersections and control points on a pipeline diagram layer, a first calculation section 12, a second calculation section 13, a third calculation section 14, a fourth calculation section 15, a fifth calculation section 16, and a sixth calculation section 17.

The intersection/control point setting section 11 reads map information of an area subject to planned pipe laying, which is stored in the storage device 10D, into the memory (hereinafter referred to as an "internal memory") on the memory board by an operator's operation. The intersection/control point setting section 11 then deploys the map information on a region serving as a map layer set in the internal memory and displays it on the display device 10C by the operator's operation.

As the operator plots locations for pipe laying on the map displayed on the display device 10C using a pointing device such as a mouse, coordinates indicative of the locations are drawn as intersections (IP) on the pipeline diagram layer superimposed on the map layer and are stored in the internal memory. These intersections include the intersections IP1, IP2, IP3, IP4 in FIG. 1A described above. Fittings such as bends and double socket tees are disposed at the respective intersections IP1, IP2, IP3, IP4.

Straight pipes are used to connect the fittings on the intersections IP. Preferably, the pipeline is laid to follow the curvature of the road. Thus, a control point (CP) is indicated on the pipeline diagram layer as an indication point for bending the straight pipes within a range of a few degrees of bending angle allowed to the assembling portions of the straight pipes. In response to this indication, the control point CP is displayed on the pipeline diagram layer similarly to the intersections IP and stored in the internal memory. In the following description, the intersection IP and the control point CP may be simply referred to as an "intersection" and a "control point," respectively.

The first calculation section 12 executes a process of selecting fittings to be disposed on the plurality of intersections set by the intersection/control point setting section 11. In response to the operator selecting each intersection, a pull-down menu listing available fittings is presented, and in response to a required fitting being selected by mouse click, the selected fitting is allocated to the intersection.

The second calculation section 13 determines the number of straight pipes required, the presence or absence of cut pipes, and the length of cut pipes based on the distance between the respective intersections and the length of straight pipes. A distance between the intersections minus the length of the fitting at each intersection is divided by the length of the straight pipe to find the number of straight pipes required. The missing length of the calculated number of straight pipes is compensated for by cut pipes. In this way, the number of straight pipes connecting the respective intersections and the cut pipe length are determined.

The third calculation section 14 generates virtual pipelines where the straight pipes determined by the second calculation section 13 are allocated between the respective intersections.

Figure 5:
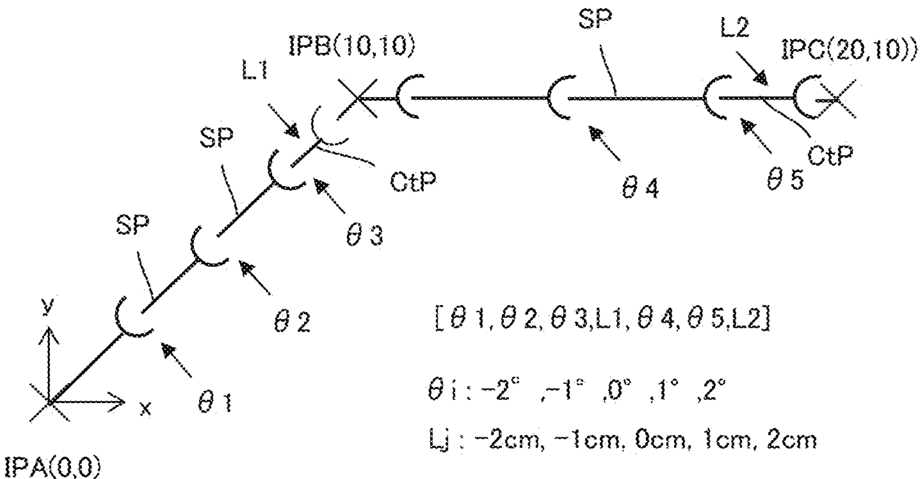
FIG. 5 illustrates characteristic evaluation data.

FIG. 5 shows a piping diagram connecting an intersection IPA (0, 0), an intersection IPB (10, 10), and an intersection IPC (20, 10) specified on the xy plane. The virtual pipeline is identified by characteristic evaluation data, which is expressed as a sequence of numbers with an assembling angle $\theta i$ (i is the number of assembling portions) of assembling portions of the respective straight pipes SP and cut pipes CtP constituting the virtual pipeline and an adjustment margin Lj (j is the number of the cut pipes) of the cut pipe length as variables that can be set within a predetermined allowable range.

Straight and cut pipes for which the assembling angle $\theta i$ can be set are those that are spigot-side joint pipes (starting-point-side joint pipes), other than pipes connected to fittings and pipes integrated with fittings to prevent bending. Specifically, for a maximum bending angle of ±4° at each joint, the bending angle along the plane is selected from the options of ±2°, ±1°, and 0°. The angle 0° means straight connection without bending. The values of the options are not limited to this example and can be set at any pitch within an angular range smaller than the maximum bending angle of ±4°.

The adjustment margin Lj for the cut pipe length is the length to adjust the length Lc of the cut pipe obtained by the aforementioned calculation, and the adjusted length is Lc+Lj. The equation of $Lj=\Delta L\times d$ is set for Lj, where ΔL is set to 0.01 m and d is selected from the options of ±2, ±1, and 0. That is, Lj is any one of ±2 cm, ±1 cm, and 0 cm. Although ΔL=0.01 m is given as an example in the present embodiment, the value of ΔL is not limited to any value. Also, the values of the options d are not limited to this example.

In the piping diagram shown in FIG. 5, the characteristic evaluation data is expressed as a sequence of numbers [θ1, θ2, θ3, L1, θ4, θ5, L2]. By selecting each of the variables θ1, θ2, θ3, L1, θ4, θ5, L2 from the above options, it is possible to define piping diagrams in five factorial ways.

The fourth calculation section 15 calculates a first characteristic value CV1, a second characteristic value CV2, a third characteristic value CV3, and a fourth characteristic value CV4 for virtual pipelines for which each of the variables θ1, θ2, θ3, L1, θ4, θ5, L2 of the characteristic evaluation data is set to any value within a predetermined allowable range, namely, in the present embodiment, for each virtual pipeline identified by the characteristic evaluation data with the variables appropriately selected from the above options.

The first characteristic value CV1 is a value identified by a difference value between the total number of intersections and control points and the number of intersections and control points each having an error, which is defined as an amount of misalignment between the virtual pipeline and each intersection and between the virtual pipeline and each control point, at or below a predetermined threshold, the latter number being a continuous count from the start point. The smaller the difference value defining the first characteristic value CV1, the less misalignment the virtual pipeline is evaluated to have.

Following a conventional design approach of manually operating a piping diagram creation device to design a piping diagram, the above approach of using the difference value focuses on a procedure of sequentially arranging pipe materials along a planned line from a start point such that errors at the intersections and control points are within a threshold.

In the present embodiment, the threshold is set to 0.3 m. However, the threshold is not limited to 0.3 m and can be set to any value depending on actual situations. Although the same threshold is set for all intersections and control points, different thresholds may be set for the intersections and control points, or a different threshold may be set for each of the intersections and control points. This is because doing so facilitates flexible adaptation to the surrounding environment or other factors of the pipe laying site.

The second characteristic value CV2 is a value identified by an error at the intersection or control point that first exceeded the threshold. As with the first characteristic value CV1, the smaller the error defining the second characteristic value CV2, the smaller the degree of deviation from the threshold at the intersections and control points in the virtual pipeline, so that such a virtual pipeline can be evaluated to have a smaller probability that the subsequent placement of pipe materials will be displaced significantly from the planned line.

The third characteristic value CV3 is a value identified by an average value of errors at the intersections and control points where the errors are at or below the threshold. The smaller the average value of the errors defining the third characteristic value CV3, the less misalignment along the planned line the virtual pipeline is evaluated to have.

The fourth characteristic value CV4 is a value identified by the proportion of the number of assembling portions with the assembling angle θi of other than 0 degrees, within the range from the start point to the intersections (IP) and the control points (CP) where the errors are at or below the threshold. The smaller the proportion defining the fourth characteristic value CV4, the greater linearity with less fluctuations the pipeline is evaluated to have.

Further, the fourth calculation section 15 calculates an evaluation value EV shown in the following equation from the characteristic values CV1 to CV4.

$$EV = CV1\times S1 + CV2\times S2 + CV3\times S3 + CV4\times S4$$

The weighting factors S1, S2, S3, S4 are used to adjust the contributions of the respective characteristic values CV1, CV2, CV3, CV4 for evaluation of each virtual pipeline defined by the characteristic evaluation data. These weighting factors are set depending on which of the characteristic values CV1, CV2, CV3, CV4 is given more importance. In the present embodiment, the weighting factors S1, S2, S3 are set to 1, and the weighting factor S4 is set to 0.2. However, the weighting factors are not limited to any values.

The fifth calculation section 16 selects one virtual pipeline from the virtual pipelines based on the evaluation values EV for the respective virtual pipelines calculated by the fourth calculation section 15. Specifically, the fifth calculation section 16 selects a virtual pipeline with the smallest evaluation value EV.

The sixth calculation section 17 generates a pipeline assembling diagram based on the sequence of numbers [θ1, θ2, θ3, L1, θ4, θ5, L2] defining the characteristic evaluation data of the virtual pipeline selected by the fifth calculation section 16.

Finding the evaluation values EV for all settable characteristic evaluation data would lead to an increased calculation load. Thus, setting a threshold that limits a range of values that can be used as the characteristic evaluation data can inhibit an increase in the calculation load. It should be noted that a configuration is also possible where the fourth calculation section 15 finds the evaluation values EV for all settable characteristic evaluation data, and a pipeline assembling diagram is generated based on the characteristic evaluation data with the smallest evaluation value EV.

Figure 3:
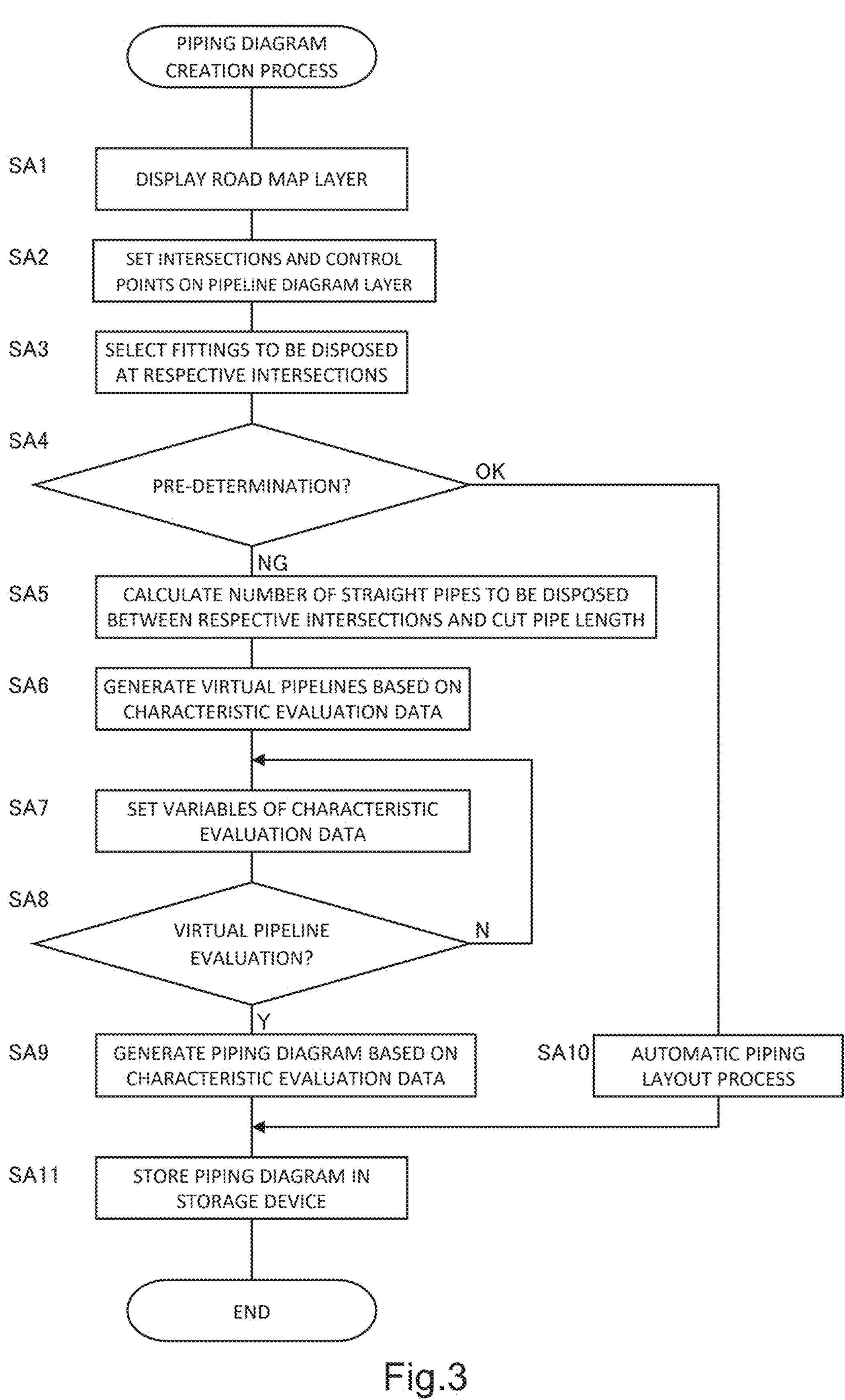
FIG. 3 is a flowchart of a piping diagram creation method according to the present invention.

The piping diagram creation method according to the present embodiment is described with reference to FIG. 3.

The road map deployed on the map layer by the intersection/control point setting section 11 is displayed on the display device 10C (SA1). The intersections IP at which the fittings are to be disposed are indicated on the pipeline diagram layer superimposed on the map layer, and also the control points CP at which the straight pipes are to be bent are indicated on the pipeline diagram layer (SA2).

Then, the first calculation section 12 selects the fittings to be disposed at the plurality of intersections IP and allocates the fittings at the respective intersections IP (SA3).

The first calculation section 12 determines in advance whether it is possible to carry out the pipe laying according to a piping layout that extends along a straight line connecting the respective intersections IP, based on the shapes of the fittings to be disposed at the respective intersections IP or the presence/absence of the control points CP specified between the respective intersections IP. If it is possible to carry out the pipe laying (SA4, OK), the process moves to the step of executing the automatic piping layout process (SA10). The automatic piping layout process is a process of calculating the number of straight pipes required and the length of the cut pipes based on the distance along the straight line connecting the respective intersections IP and generating a piping diagram in which the calculated straight and cut pipes are connected to the fittings at the intersections IP. The results of the automatic piping layout process are stored in the storage device 10D at step SA11.

The determination of whether it is possible to carry out the pipe laying according to the piping layout along the straight line connecting the respective intersections IP is made based on whether the sockets of the fittings at the intersections IP are aligned with the extending direction of the straight line connecting the respective intersections IP. If the sockets are aligned with the extending direction, it is determined that such pipe laying can be carried out; if the sockets are not aligned with the extending direction, it is determined that the pipe laying cannot be carried out. If the pipe laying cannot be carried out (SA4, NG), the process moves to a process of generating virtual pipelines.

At step SA5, the second calculation section 13 determines the number of straight pipes required, the presence/absence of the cut pipes, and the length of the cut pipes based on the distance between the respective intersections and the length of the straight pipes. Further, the third calculation section 14 generates virtual pipelines based on the characteristic evaluation data described above (SA6), and the fourth calculation section 15 sets values selected from a predefined table of options for the variables constituting the characteristic evaluation data (SA7).

The table of options is a table that presents options for the respective variables θ1, θ2, θ3, L1, θ4, θ5, L2 of the characteristic evaluation data, and presents values that can be selected as any values falling within a predetermined allowable range. In the above example, the values ±2°, ±1°, and 0° are the options for the assembling angle θi, and the values ±2 cm, ±1 cm, and 0 cm are the options for the adjustment margin Lj of the cut pipe length.

Further, the fourth calculation section 15 iterates the process of calculating the evaluation value EV of each virtual pipeline with the characteristic evaluation data selected at step SA7 for all options set in the table of options, and the fifth calculation section 16 selects one virtual pipeline that is defined by the characteristic evaluation data with the smallest evaluation value, from all evaluation values EV calculated by the fourth calculation section 15 (SA7, SA8).

The sixth calculation section 17 generates a pipeline assembling diagram (piping diagram) based on the characteristic evaluation data of the one virtual pipeline selected by the fifth calculation section 16 (SA9), and the piping diagram is stored in the storage device 10D (SA11).

Second Aspect of the Piping Diagram Creation Device

A second aspect of the piping diagram creation device 10 is described below. The below description focuses on differences from the above first aspect, and description of components similar to those in the first aspect will be omitted.

In the first aspect, the third calculation section 14 and the fourth calculation section 15 iterate the process of updating the characteristic evaluation data and calculating and evaluating the evaluation values. The second aspect differs in that a plurality of instances of the characteristic evaluation data are generated in advance, and the characteristic evaluation data is optimized using genetic algorithms GA.

That is, the third calculation section 14 generates virtual pipelines identified by a plurality of individuals each having, as genes, the assembling angle θi (i is the number of assembling portions) of the assembling portions of the respective straight pipes constituting the virtual pipeline and the adjustment margin Lj (j is the number of cut pipes) of the cut pipe length.

The characteristic evaluation data expressed by the above sequence of numbers [θ1, θ2, θ3, L1, θ4, θ5, L2] is an individual, and the variables θ1, θ2, θ3, L1, θ4, θ5, L2 are considered as genes. In the present embodiment, the number of individuals of a first generation is set to 300. However, the number of individuals is not limited to any value and is set as appropriate.

For each individual generated by the third calculation section 14, the fourth calculation section 15 calculates the characteristic values CV1-CV4 and the evaluation value EV based on the characteristic values CV1-CV4, in the same manner as in the above first aspect.

The fifth calculation section 16 executes the genetic algorithms that iterate a generation change process including a selection process of selecting certain individuals based on the evaluation value EV of each individual and, as part of the selection process, including either or both a crossover process of recombining genes between individuals and a mutation process of changing genes of any individual. The fifth calculation section 16 thus generates an individual with optimized genes having an excellent evaluation value.

The selection process performed by the fifth calculation section 16 includes an elite strategy method of extracting an individual with the best evaluation value EV (i.e., the smallest evaluation value EV) from the individuals and a tournament method of iterating a process of selecting an individual with a relatively good evaluation value EV from any number of individuals randomly selected from the remaining individuals until the number of process iterations equals the number of individuals of the generation. The crossover process includes a process of taking adjacent even-numbered and odd-numbered individuals with a certain probability and performing crossover of genes by a two-point crossover method. The mutation process includes a process of selecting a certain proportion of individuals with lesser evaluation values from the individuals and setting all genes thereof to zero and a process of swapping any adjacent genes of an individual extracted with a certain probability.

The fifth calculation section 16 performs the generation change process up to a predetermined generation and selects, as one best virtual pipeline, an individual with the smallest evaluation value EV from individuals of the last generation.

The sixth calculation section 17 generates a pipeline assembling diagram (piping diagram) based on genes of the individual selected as the one virtual pipeline by the fifth calculation section 16.

Figure 4:
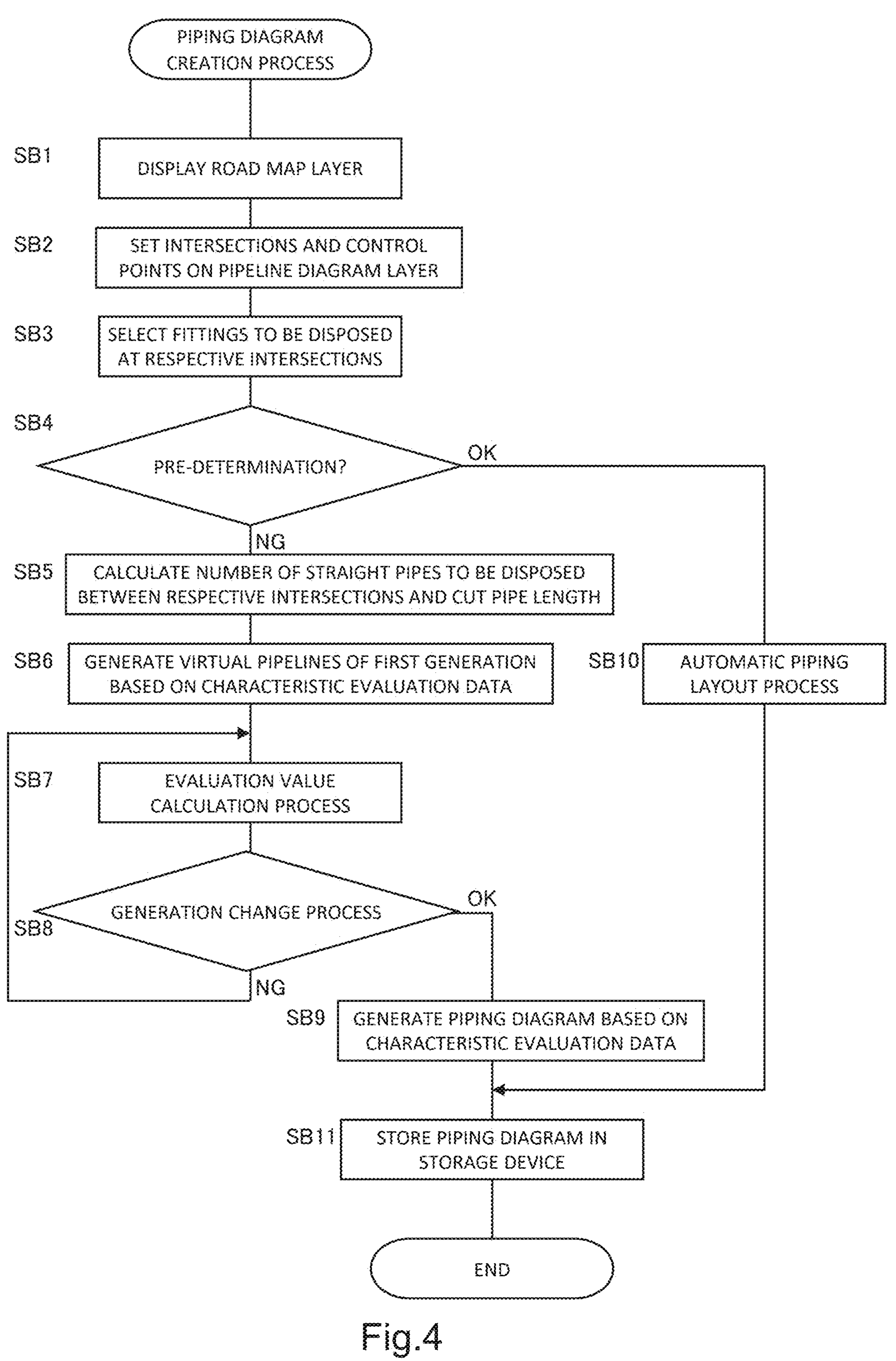
FIG. 4 is a flowchart of another aspect of the piping diagram creation method according to the present invention.

FIG. 4 shows a procedure of the piping diagram creation method of the second aspect. Steps SB6-SB9 differ from the procedure of the piping diagram creation method shown in FIG. 3, and the rest of the steps is identical thereto.

At step SBS, the second calculation section 13 determines the number of straight pipes required, the presence or absence of cut pipes, and the length of cut pipes based on the distance between the respective intersections and the length of straight pipes.

Further, the third calculation section 14 generates virtual pipes of 300 individuals of the first generation defined by the characteristic evaluation data (SB6). The fourth calculation section 15 calculates the evaluation value EV of each individual (SB7), and the fifth calculation section 16 performs the generation change process (SB8).

The evaluation value calculation process at step SB7 and the generation change process at step SB8 are iterated until the generation change process reaches a pre-set number of generations (40 generations in the present embodiment). Upon completion of the evaluation value calculation process up to the pre-set number of generations, a virtual pipeline with the smallest evaluation value EV is selected as one best virtual pipeline, from virtual pipelines of 300 individuals of the last generation (SB8, OK), and a piping diagram is generated based on the characteristic evaluation data of the one virtual pipeline (SB9).

Generation Change Process

The generation change process is now detailed.

The genes of individuals $I_{Nm}$ of the Nth generation are expressed as $[\theta 1_{Nm}, \theta 2_{Nm}, \theta 3_{Nm}, L1_{Nm}, \theta 4_{Nm}, \theta 5_{Nm}, L2_{Nm}]$, where m is the number of individuals, i.e., the population.

First, an evaluation value $EV_{1m}$ is calculated for respective genes $[\theta 1_{1m}, \theta 2_{1m}, \theta 3_{1m}, L1_{1m}, \theta 4_{1m}, \theta 5_{1m}, L2_{1m}]$ of m individuals $I_{1m}$ of the first generation.

First, a selection process employing an elite strategy method and a tournament method is performed. The elite strategy method refers to a process of unconditionally extracting, as an individual of the next generation, one individual with the smallest evaluation value $EV_{1m}$ from m individuals $I_{1m}$ of the first generation. The tournament method refers to a process of iterating the selecting of an individual(s) (one individual in the present embodiment) with a relatively good evaluation value EV from any number (three in the present embodiment) of individuals randomly selected from m individuals $I_{1m}$ of the first generation until the number of process iterations equals the population (number of individuals) of the generation. An individual with a smaller evaluation value $EV_{1m}$ is determined to have a greater fitness. It is preferable that about three individuals be selected for comparison, but the number of individuals to be selected is not limited to this value and can be set as appropriate. Also, the number of individuals to be selected as an individual(s) with a relatively good evaluation value EV is not limited to one, and a plurality of individuals may be selected as individuals with a relatively good evaluation value EV, in relation to the number of individuals selected for comparison.

Through the selection process, individuals with a larger evaluation value $EV_{1m}$, i.e., with a lower fitness, are eliminated, resulting in individuals with a greater fitness surviving into the next generation. In the present embodiment, the selection is iterated such that the number of selected individuals equals the population (number of individuals), resulting in the same number of individuals as those of the first generation. Roulette or other selection methods may be employed in the selection process, instead of the tournament method.

Then, individuals selected through the selection process are subjected to a crossover process, in which adjacent even-numbered and odd-numbered individuals are taken with a certain probability and genes are crossed over by a two-point crossover method. In the present embodiment, the probability of the crossover is set to 70%. Thus, 30% of the individuals that survived through the selection process will remain as they are.

First and second mutation processes are performed on the individuals having undergone the crossover process. The first mutation process, which is a modified version of the inversion method, swaps any adjacent genes of an individual extracted with a certain probability (30% in the present embodiment). The number of swaps is not limited to one and can be set as appropriate depending on the number of genes. Note that the inversion method is a method of inverting the order of two random genes.

Swapping arbitrarily selected genes has a large effect on the entire pipeline, which would make it difficult to improve the evaluation value even after generational changes. However, swapping adjacent genes allows for fine adjustment while reducing the effect on the entire pipeline. The predetermined probability is not limited to 30% and can be adjusted as appropriate.

The second mutation process is a process of selecting a certain proportion (15% in the present embodiment) of individuals with a lesser evaluation value from the individuals and setting all genes of the selected individuals to zero. In the present embodiment a "lesser evaluation value" means a larger evaluation value.

Through the mutation process of setting all genes of a certain proportion of individuals with lesser evaluation values to zero, virtual pipelines with genes exhibiting straight pipeline shapes can survive into the next generation at a certain ratio. In the context of generating a straight pipeline, iterating such a process can generate a pipeline having excellent linearity with less fluctuations, rather than a straight pipeline that has many fluctuations with repeated minor curvatures. The certain proportion is not limited to 15% and can be adjusted as appropriate.

Thus, genes $[\theta 1_{2m}, \theta 2_{2m}, \theta 3_{2m}, L1_{2m}, \theta 4_{2m}, \theta 5_{2m}, L2_{2m}]$ of individuals $I_{2m}$ of the second generation are generated, and the same process is iterated.

Third Aspect of the Piping Diagram Creation Device

In a third aspect, the characteristic values calculated by the fourth calculation section 15 are different from those described in the above first and second aspects.

The fourth calculation section 15 calculates an evaluation value, i.e., a fitness, of each virtual pipeline obtained by setting the variables θ1, θ2, θ3, L1, θ4, θ5, L2 of the characteristic evaluation data to any values falling within a predetermined allowable range, based on a fifth characteristic value CV5, a sixth characteristic value CV6, and a seventh characteristic value CV7, where the fifth characteristic value CV5 is a cumulative value of errors between each intersection and a position on each virtual pipeline corresponding to each intersection, the sixth characteristic value CV6 is a cumulative value of the number of assembling portions with an assembling angle of other than 0 degrees, and the seventh characteristic value CV7 is a cumulative value of distances between each control point and each virtual pipeline.

The fifth characteristic value CV5 is expressed as $CV5 \Rightarrow \Sigma(\Delta E_{ip})$, where $\Delta E_{ip}$ is an error between an intersection and a position on each virtual pipeline corresponding to the intersection, and the accumulated error value for all intersections is the fifth characteristic value CV5. The smaller the accumulated error value, the greater fitness the virtual pipeline is determined to have.

The sixth characteristic value CV6 is expressed as CV6=Σ($J_f$), where $J_f$ represents bent joints, and the total number of bent joints is the sixth characteristic value CV6. The fewer the number of bent joints, the greater fitness the virtual pipeline is determined to have.

The seventh characteristic value CV7 is expressed as CV7=Σ($D_{pp}$), where $D_{pp}$ is a separation distance between a control point and the pipeline (the shortest distance between the control point and the pipeline). The total value of separation distances between the control points and the pipeline is the seventh characteristic value CV7. The smaller the total value of the separation distances between the control points and the pipeline, the greater fitness the virtual pipeline is determined to have because the virtual pipeline will pass through positions closer to the control points.

The evaluation value EV of each virtual pipeline is expressed as a sum of products of the characteristic values by predetermined weighting factors for the respective characteristic values, resulting in an equation of EV=CV5×S5+CV6×S6+CV7×S7. The weighting factors S5, S6, S7 are used to adjust the contributions of the respective characteristic values CV5, CV6, CV7 for evaluation of each virtual pipeline defined by the characteristic evaluation data. These weighting factors are set depending on which of the characteristic values CV5, CV6, CV7 is given more importance. For example, when the intersection positions are given more importance, the weighting factor S5 will be set to a larger value than the other weighting factors S6 and S7.

The above seventh characteristic value CV7 is an evaluation item that is used when a control point(s) is set. When no control point is set, only the fifth characteristic value CV5 and the sixth characteristic value CV6 will be used for evaluation. It is also possible to only use the fifth characteristic value CV5 and the sixth characteristic value CV6 for evaluation when few control points are set.

That is, the piping diagram creation method of the third aspect includes: a step of calculating an evaluation value of each virtual pipeline obtained by setting variables of the characteristic evaluation data to any values falling within a predetermined allowable range, based on the fifth characteristic value CV5 and the sixth characteristic value CV6, where the fifth characteristic value CV5 is a cumulative value of errors between each intersection and a position on each virtual pipeline corresponding to each intersection, and the sixth characteristic value CV6 is a cumulative value of the number of assembling portions with an assembling angle of other than 0 degrees; and a step of generating a pipeline assembling diagram based on the characteristic evaluation data of a virtual pipeline that has an evaluation value at or below a predetermined threshold from among the virtual pipelines.

Preferably, the evaluation value calculated at the step of calculating the evaluation value of each virtual pipeline further includes the seventh characteristic value CV7, which is a cumulative value of separation distances between each virtual pipeline and each control point.

Fourth Aspect of the Piping Diagram Creation Device

The fourth aspect is a somewhat modified version of the above third aspect.

That is, the fourth calculation section 15 calculates an evaluation value, i.e., a fitness, of each virtual pipeline obtained by setting variables θ1, θ2, θ3, L1, θ4, θ5, L2 of the characteristic evaluation data to any values falling within a predetermined allowable range, based on an eighth characteristic value, a ninth characteristic value, and a tenth characteristic value, where the eighth characteristic value is an average value of errors between each intersection and a position on each virtual pipeline corresponding to each intersection, the ninth characteristic value is a ratio of the number of assembling portions with an assembling angle of other than 0 degrees to the total number of assembling portions, and the tenth characteristic value is an average value of distances between each control point and each virtual pipeline.

In the first to third aspects described above, a virtual pipeline is generated based on the single instance of the characteristic evaluation data over the entire region of the pipeline layer on which the intersections are specified, and that virtual pipeline is evaluated. However, in cases where the pipeline includes branch points, a virtual pipeline based on the characteristic evaluation data may be generated and evaluated for each pipeline connecting the branch points.

EXAMPLE

An example of the piping layout process using the genetic algorithms GA of the second aspect is described below.

Figure 6A:
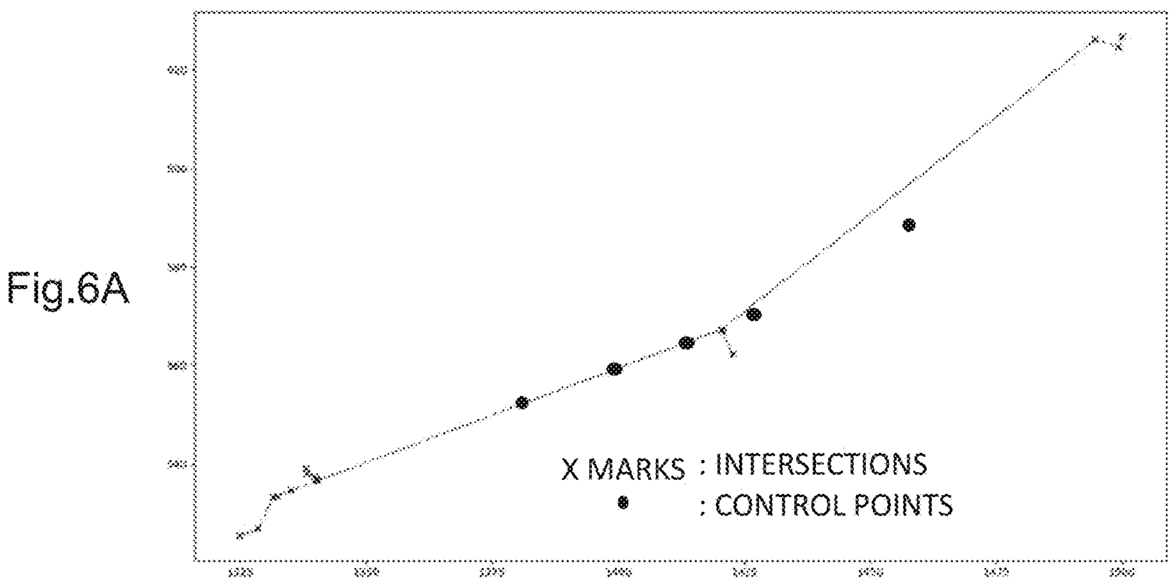
FIG. 6A illustrates specified intersections and control points.
Figure 6B:
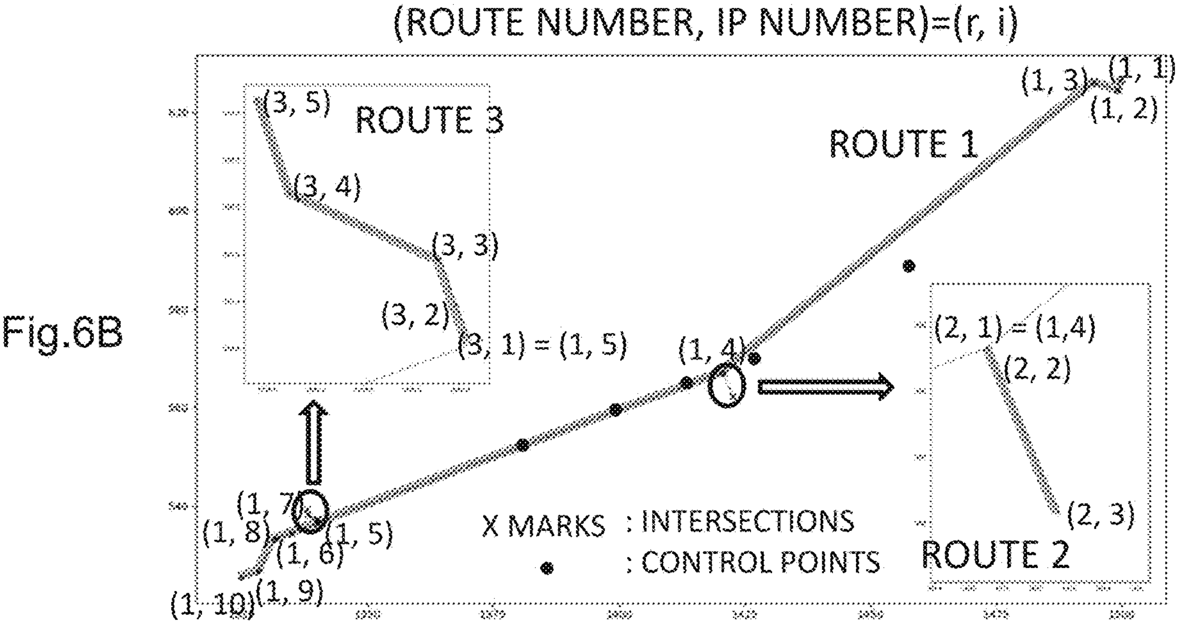
FIG. 6B illustrates route numbers and intersection numbers.

FIG. 6A shows intersections and control points specified on the pipeline diagram layer and a pipeline (indicated by dashed lines) connecting the intersections with straight lines. FIG. 6B shows identification codes of the intersections constituting a main pipeline (route 1) and branch pipelines (routes 2 and 3) branching off of the main pipeline.

FIG. 7 shows the route numbers and intersection numbers shown in FIG. 6B, x, y coordinates of each intersection, and allowable movement (1 m). The virtual pipelines finally obtained at step SB7 in FIG. 4 are the virtual pipelines wherein each intersection is within the allowable movement limit. FIG. 8 shows a list of fittings disposed at the respective intersections. Blanks other than those associated with the start and end points represent that bends are to be disposed.

FIG. 9A shows x, y coordinates of the specified control points and a route including the control points. FIG. 9B shows route connection information indicating whether and to which intersection a tee (branch pipe) should be connected to, if any.

When intersections and control points are set using the above intersection/control point setting section 11, values shown in FIGS. 7-9B are entered.

Figure 10:
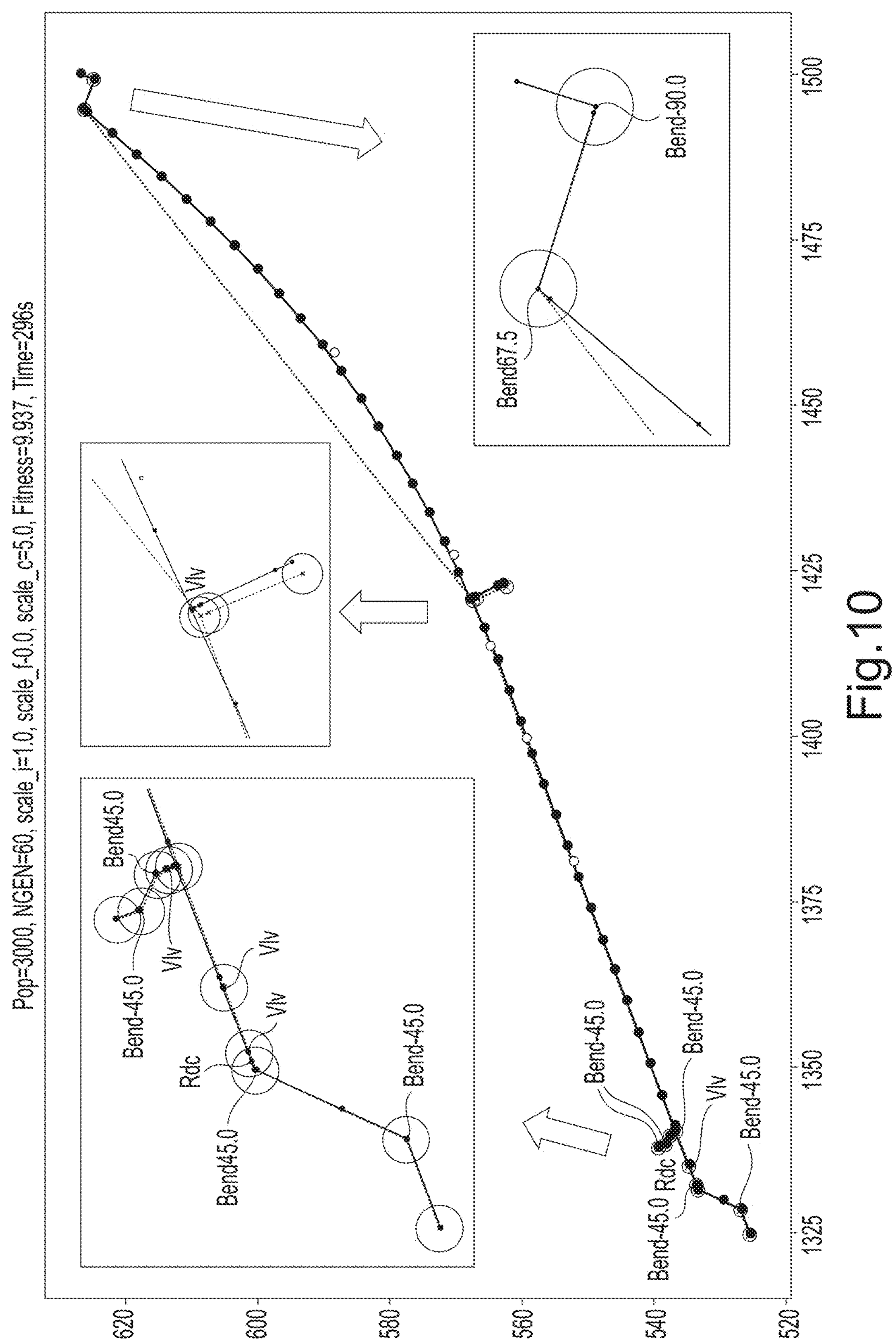
FIG. 10 illustrates a piping diagram generated by the piping diagram creation method of the present invention.

FIG. 10 shows results of the piping layout process for the pipeline with such intersections and control points, using the genetic algorithms GA of the second aspect. White circles represent the control points, and black circles represent the assembling portions of the pipeline. With the number of individuals of the first generation set to 300 and the number of generations set to 40, it takes a few seconds to generate a piping diagram with a total length of about 100 m using about 20 pipe materials. As such, an extremely efficient process is enabled compared to manually inputting the piping diagram shown in FIG. 10, which would take several hours. Note that the piping diagram shown in FIG. 10 is merely an example and does not represent the best piping diagram.

The above embodiment illustrates certain aspects of the present embodiment. It will be readily appreciated that the descriptions of the embodiment do not limit the technical scope of the present invention, and various changes and modifications can be made as appropriate to the extent that such changes and modifications still provide the functions and benefits of the present invention.

REFERENCE SIGNS LIST

10 Piping diagram creation device
10A Computer main unit
10B Input device
10C Display device
10D Storage device
11 Intersection/control point setting section
12 First calculation section
13 Second calculation section
14 Third calculation section
15 Fourth calculation section
16 Fifth calculation section
17 Sixth calculation section

The invention claimed is:

1. A piping diagram creation method for creating a piping diagram of a pipeline connecting a plurality of intersections specified on a map between a start point and an end point and passing through a control point selectively specified between the respective intersections, the method comprising:

a first step of selecting fittings to be disposed at the respective intersections;

a second step of determining a number of straight pipes required, presence or absence of cut pipes, and a length of the cut pipes, based on a distance between the respective intersections and a length of the straight pipes;

a third step of generating virtual pipelines on which the straight pipes and the cut pipes determined at the second step are allocated between the respective intersections, each of the virtual pipelines being identified by characteristic evaluation data expressed as a sequence of numbers with an assembling angle θi, i is a number of assembling portions, of assembling portions of the respective straight pipes and cut pipes constituting the virtual pipeline and an adjustment margin Lj, j is a number of cut pipes, of the cut pipe length as variables that are settable within a predetermined allowable range;

a fourth step of calculating an evaluation value of each of the virtual pipelines generated at the third step based on a first characteristic value identified by a difference value between a total number of intersections and control points and a number of intersections and control points each having an error at or below a predetermined threshold, the number of intersections and control points being a continuous count from a start point, the error being defined as an amount of misalignment between the virtual pipeline and each intersection and between the virtual pipeline and each control point, a second characteristic value identified by the error at one of the intersections or the control point that first exceeds the threshold, a third characteristic value identified by an average value of the errors at the intersections and the control point having the errors at or below the threshold, and a fourth characteristic value identified by a proportion of a number of assembling portions with the assembling angle θi of other than 0 degrees, within a range from the start point to the intersections and the control point having the errors at or below the threshold;

a fifth step of selecting one virtual pipeline from the virtual pipelines based on the evaluation value; and a sixth step of generating a pipeline assembling diagram based on characteristic evaluation data of the virtual pipeline selected at the fifth step.

2. The piping diagram creation method according to claim 1, wherein the evaluation value is a sum of products of the respective characteristic values by predetermined weighting factors for the respective characteristic values.

3. The piping diagram creation method according to claim 1, wherein the third step includes forming the respective virtual pipelines from individuals including, as genes, the assembling angle θi, i is the number of assembling portions, of the assembling portions of the respective straight pipes and cut pipes and the adjustment margin Lj, j is the number of cut pipes, of the cut pipe length, the fifth step includes executing a genetic algorithm to generate an individual with optimized genes, the genetic algorithm iterating a generation change process including any of a selection process of selecting one or more certain individuals based on evaluation values of respective individuals, a crossover process of recombining genes between individuals, and a mutation process of changing genes of any individual, and the sixth step includes generating a pipeline assembling diagram based on the optimized genes of the individual.

4. The piping diagram creation method according to claim 3, wherein the selection process includes an elite strategy method of extracting an individual with a best evaluation value from all of the individuals and a tournament method of iterating a process of selecting an individual with a relatively good evaluation value from any number of individuals randomly selected from remaining ones of the individuals until a number of individuals obtained by the selection process equals a number of individuals of a relevant generation.

5. The piping diagram creation method according to claim 3, wherein the crossover process includes a process of taking adjacent even-numbered and odd-numbered ones of the individuals with a certain probability and performing crossover of genes by a two-point crossover method.

6. The piping diagram creation method according to claim 3, wherein the mutation process includes a process of selecting a certain proportion of individuals with lesser evaluation values from the individuals and setting all genes thereof to zero.

7. The piping diagram creation method according to claim 3, wherein the mutation process includes a process of swapping any adjacent genes of an individual extracted with a certain probability from the individuals.

8. The piping diagram creation method according to claim 1, further comprising a pre-determination step of determining in advance whether it is possible to carry out a piping layout along a straight line connecting respective intersections, based on shapes of fittings to be disposed at the respective intersections or presence/absence of a control point specified between the respective intersections, wherein upon determination at the pre-determination step that it is impossible to carry out the piping layout along the straight line connecting the intersections, the second to sixth steps are performed.

9. A piping diagram creation device for creating a piping diagram of a pipeline connecting a plurality of intersections specified on a map between a start point and an end point and passing through a control point selectively specified between the respective intersections, the device comprising:

a processor programmed to:

select fittings to be disposed at the respective intersections;

determine a number of straight pipes required, presence or absence of cut pipes, and a length of the cut pipes, based on a distance between the respective intersections and a length of the straight pipes;

generate virtual pipelines on which the straight pipes and the cut pipes are allocated between the respective intersections, each of the virtual pipelines being identified by characteristic evaluation data expressed as a sequence of numbers with an assembling angle θi, i is a number of assembling portions, of assembling portions of the respective straight pipes and cut pipes constituting the virtual pipeline and an adjustment margin Lj, i is a number of cut pipes, of the cut pipe length as variables that are settable within a predetermined allowable range;

calculate an evaluation value of each of the virtual pipelines-generated by calculation section based on a first characteristic value identified by a difference value between a total number of intersections and control points and a number of intersections and control points each having an error at or below a predetermined threshold, the number of intersections and control points being a continuous count from a start point, the error being defined as an amount of misalignment between the virtual pipeline and each intersection and between the virtual pipeline and each control point, a second characteristic value identified by the error at one of the intersections or the control point that first exceeds the threshold, a third characteristic value identified by an average value of the errors at the intersections and the control point having the errors at or below the threshold, and a fourth characteristic value identified by a proportion of a number of assembling portions with the assembling angle θi of other than 0 degrees, within a range from the start point to the intersections and the control point having the errors at or below the threshold;

select one virtual pipeline from the virtual pipelines based on the evaluation value;

generate a pipeline assembling diagram based on characteristic evaluation data of the virtual pipeline.

10. The piping diagram creation device according to claim 9, wherein the evaluation value is a sum of products of the respective characteristic values by predetermined weighting factors for the respective characteristic values.

11. The piping diagram creation device according to claim 9, wherein the processor is further programmed to;

form the respective virtual pipelines from individuals including, as genes, the assembling angle θi, i is the number of assembling portions, of the assembling portions of the respective straight pipes and cut pipes and the adjustment margin Lj, j is the number of cut pipes, of the cut pipe length, execute a genetic algorithm to generate an individual with optimized genes, the genetic algorithm iterating a generation change process including any of a selection process of selecting one or more certain individuals based on evaluation values of respective individuals, a crossover process of recombining genes between individuals, and a mutation process of changing genes of any individual, and generate a pipeline assembling diagram based on the optimized genes of the individual.

12. The piping diagram creation device according to claim 11, wherein the selection process includes an elite strategy method of extracting an individual with a best evaluation value from all of the individuals and a tournament method of iterating a process of selecting an individual with a relatively good evaluation value from any number of individuals randomly selected from remaining ones of the individuals until a number of individuals obtained by the selection process equals a number of individuals of a relevant generation.

* * * * *